United States Patent [19]

Ota et al.

[11] 4,442,485

[45] Apr. 10, 1984

[54] DYNAMICALLY BUFFERED DATA TRANSFER SYSTEM FOR LARGE CAPACITY DATA SOURCE

[75] Inventors: Hideo Ota; Yutaka Kubo, both of Hitachi, Japan

[73] Assignee: Hitachi, Ltd., Tokyo, Japan

[21] Appl. No.: 213,403

[22] Filed: Dec. 5, 1980

[30] Foreign Application Priority Data

Dec. 7, 1979 [JP] Japan .............................. 54-158065
Feb. 18, 1980 [JP] Japan .............................. 55-17833

[51] Int. Cl.³ .......................... G06F 3/04; G06F 9/06
[52] U.S. Cl. ..................................... 364/200; 455/12
[58] Field of Search ... 364/200 MS File, 900 MS File, 364/455; 370/104; 455/12, 13

[56] References Cited

U.S. PATENT DOCUMENTS 3,979,555  9/1976  Opittek et al. .
4,232,197 11/1980  Acampora et al. ................ 370/97
4,298,954 11/1981  Bigelow et al. .................... 364/900

*Primary Examiner*—James D. Thomas
*Assistant Examiner*—Archie E. Williams, Jr.
*Attorney, Agent, or Firm*—Antonelli, Terry & Wands

[57] ABSTRACT

A data input/output system is provided for transfer of data between a large capacity data source and a large-capacity memory. The data input/output control information is supplied from a processor. If the actual time between input/output information units from the large-capacity data source is shorter than that time determined by a program in the processor, an interruption signal is generated to be in time for the input/output timing of the next input/output data unit. The system permits continuous data transfer switching from one input/output data unit to the next input/output data unit without use of the program in the processor.

18 Claims, 11 Drawing Figures

DYNAMICALLY BUFFERED DATA TRANSFER SYSTEM FOR LARGE CAPACITY DATA SOURCE

BACKGROUND OF THE INVENTION

The present invention relates to data input/output operation methods and systems, and particularly to a data input/output method and system suitable for use in semipermanent high-speed input or output of a great amount of digitized image data, such as is transmitted from a larger-capacity data source, for example a satellite.

In a typical computer, the data input/output operation is performed in accordance with a predetermined timing under the control of the computer, or as in the case of communications control, the data input/output is similarly performed after a preliminary signal exchange among a plurality of sending and receiving apparatus has been completed. That is, in any case, a program chiefly controls the input/output of data.

In the field of satellite image processing, however, it is a common practice that the image data transmitted from a satellite to earth is recorded on a high-density magnetic tape or the like, which serves as a special high-speed data recording means on the ground, and then the recorded data is reproduced therefrom and applied to a computer. In this case, the data input to the computer is semipermanently received so that the computer is required to process the data flow without delay. In other words, it is necessary that the input/output operation is not performed under the control of a program, but is performed under the control of a large-capacity data source, such as a satellite.

In order to explain this invention in comparison with the conventional technique, the drawings will be described briefly.

Figure 1:
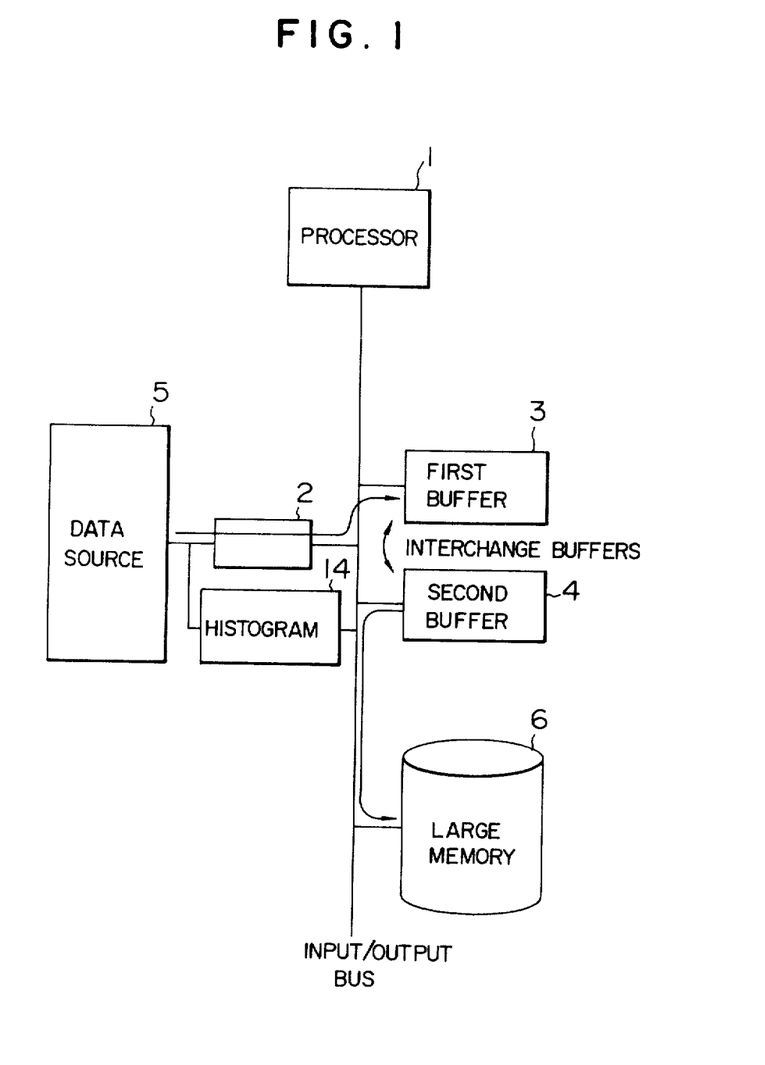
FIG. 1 is a schematic block diagram of one example of a data input/output system.

FIG. 1 is a schematical block diagram of an example of a data input/output system.

The operation of this system will hereinafter be described briefly:

(1) Input is started from a large-capacity data source 5 by a processor 1.

(2) The input data is first applied through an interface 2 to a first buffer 3.

(3) When the first buffer 3 becomes full of input data, the program switches addresses, permitting input data to be applied to a second buffer 4.

(4) The data stored in the first buffer 3 at (2) is transferred to a large-capacity memory 6 during the time when input data is being applied to the second buffer 4.

(5) When the second buffer 4 becomes full of input data, the first buffer 3 is switched again, and during the time when input data is applied to the first buffer 3 the contents of the second buffer 4 are transferred to and stored in the large-capacity memory 6.

Figure 2:
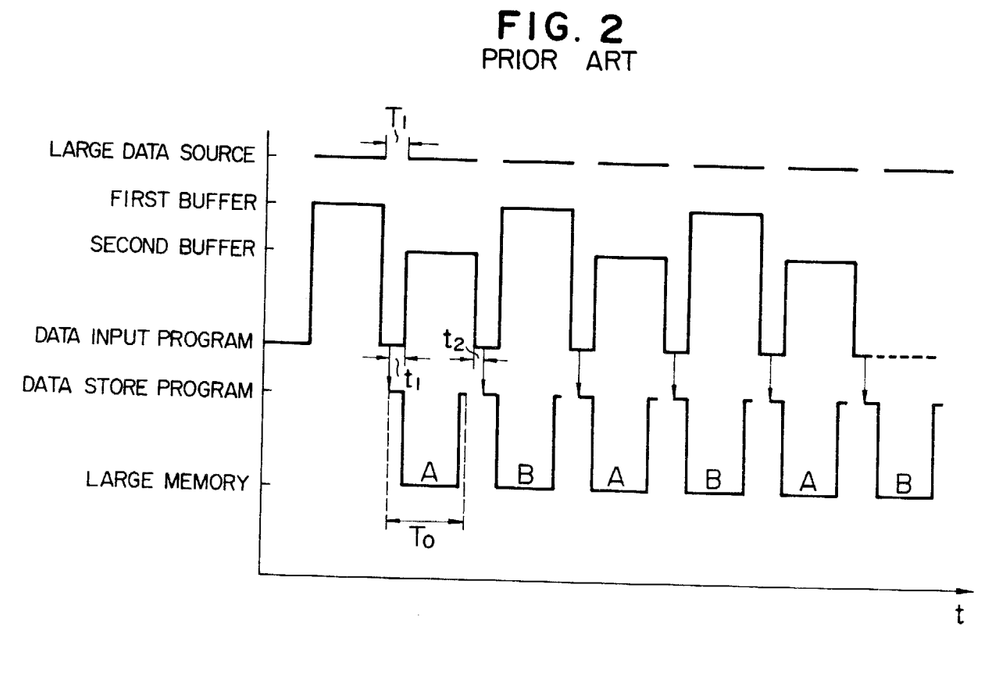
FIG. 2 is a timing chart of a conventional input/output processing.

Thus, the data from the large-capacity data source 5 is inputted to the computer by the repetition of the above operations, which are shown in the timing chart of FIG. 2. From this timing chart, it will be understood that to perform the above processes (1) to (5) without trouble the following two relations must be satisfied:

(1) The overhead time, $(t_1+t_2)$ of the program for the input to the first or second buffer must be shorter than each of the transfer periods $T_1$ during which data from the large-capacity data source is transferred, as expressed by $$t_1+t_2<T_1$$

(2) The time, $T_0$ required for data to be stored in the large-capacity memory 6 must be much shorter than the time in which input data is applied to the first or second buffer 3 or 4.

The latter relation (2) can be solved by use of a sufficiently high-speed large-capacity memory.

The former relation (1) is such that the data from the large-capacity data source 5 cannot be inputted unless the data transfer period $T_1$ is longer than the overhead time $(t_1+t_2)$ of the input/output program on the processor side.

This overhead time $(t_1+t_2)$ is usually several m sec in the common computer, while the time $T_1$ is typically 1 m sec or below.

Therefore, if the data transfer period $T_1$ is shorter than the overhead time $(t_1+t_2)$, the conventional system cannot achieve the input/output of data. By the way, numeral 14 in FIG. 1 represents a histogram apparatus used in the present invention, as will be described later.

SUMMARY OF THE INVENTION

Accordingly, it is an object of the invention to provide a data input/output method and system capable of input/output of data during a short period in which data is transferred, with the drawback of the prior art being obviated.

According to the present invention there is provided a data input/output method and system in which, when the input/output transfer of data is performed between the large-capacity data source and the large-capacity memory while data input/output control information is supplied from the processor, if the actual time between input/output information units from the large-quantity data source is shorter than the time determined by the program in the processor, an intermediate interruption signal is generated for the input/output timing of the next input/output information unit, permitting continuous data transfer switching from one input/output information unit to the next input/output information unit without use of the program in the processor.

DESCRIPTION OF THE PREFERRED EMBODIMENT

Figure 3:
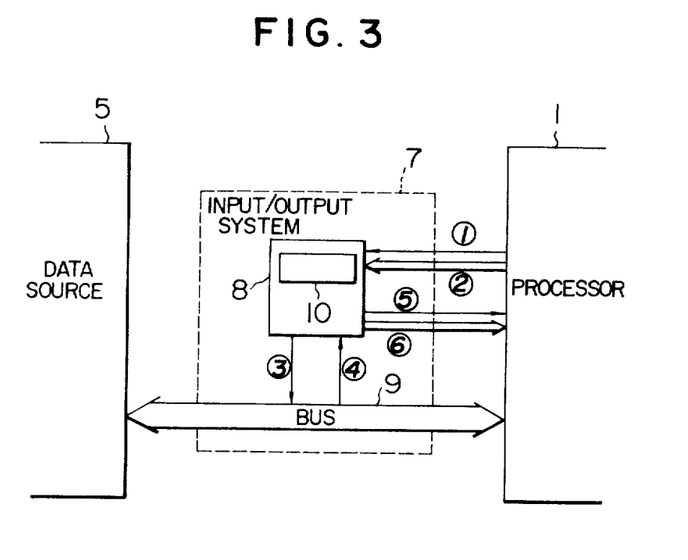
FIG. 3 is a fundamental block diagram of an embodiment of the data input/output system according to the invention.
Figure 4:
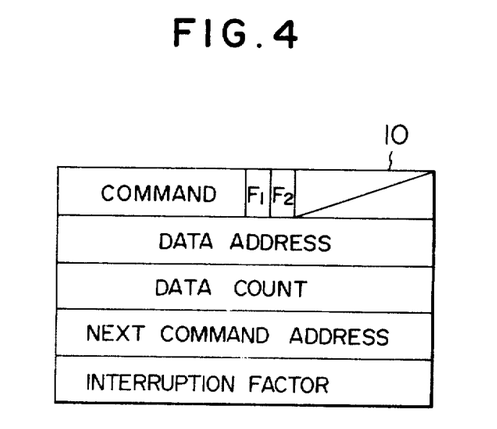
FIG. 4 shows the contents of a control register in the above embodiment.

FIG. 3 shows a data input/output system 7 as an embodiment of this invention, which comprises a data transferring input/output bus 9 provided between the large-capacity data source 5 and the processor 1, and an input/output system control section 8 for the control of the bus 9. The input/output system control section 8 has a control register 10 for storing the actual input/output controlling information. FIG. 4 shows an example of the information to be stored in the control register 10. This information is formed of a COMMAND which includes a command code such as RESET, READ, and WRITE. A command chain flag $F_1$ indicates whether the next command to be executed is chained or not ("1" indicates the presence of a chain, and "0" the absence of a chain). An interruption flag $F_2$ indicates whether or not an interruption signal is to be applied to the processor 1 when this command has been executed ("1" indicates that an interruption signal is to be applied thereto, and "0" calls for no interruption signal). A DATA designates a leading address of data to be outputted in a memory of the processor 1. A DATA COUNT is the number of words of data to be outputted. The NEXT COMMAND ADDRESS represents an address in the processor memory, which becomes significant only when $F_1 = 1$, and at which the next input/output control information to be executed is stored. An INTERRUPTION FACTOR represents an additional information for identifying to which input/output control information the interruption signal corresponds.

When the interruption occurs, both the INTERRUPTION FACTOR and the information indicating whether the command is abnormal/normal are applied to the processor 1.

The operation of the data input/output system 7 will be described with reference to FIGS. 5 to 7 in which the interface 2 in FIG. 1 is replaced by the system 7.

Figure 5:
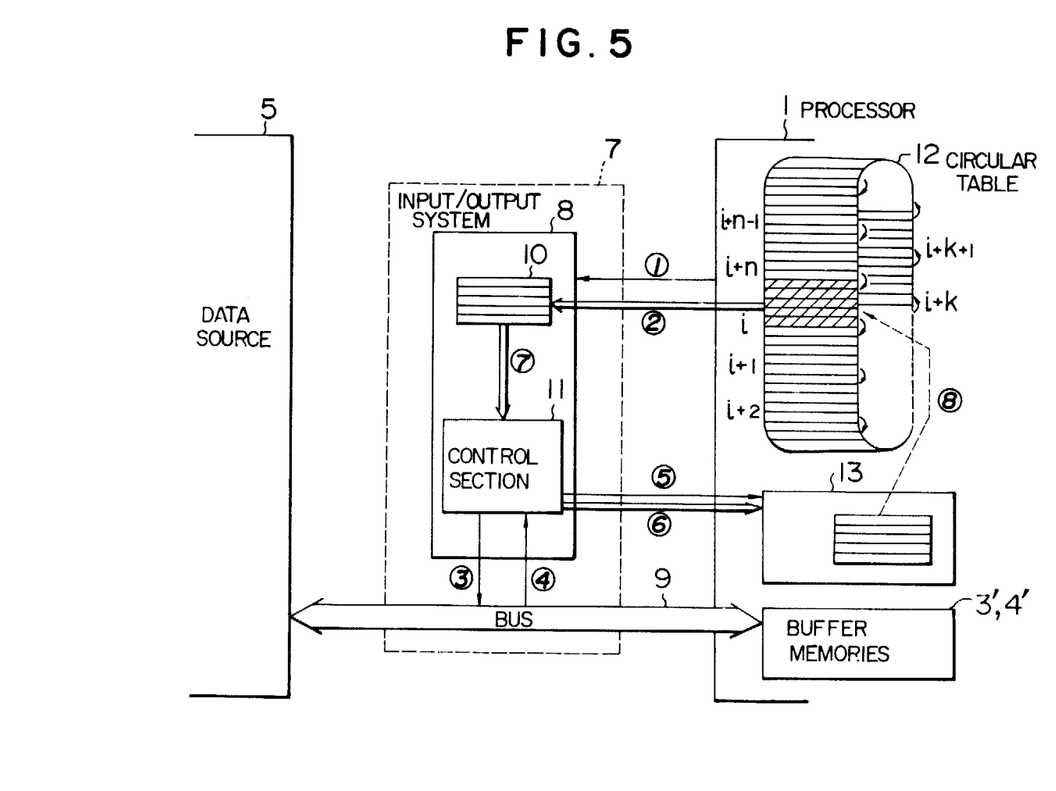
FIG. 5 is a detailed block diagram of the above embodiment.

The processor 1 as shown in FIG. 5 includes a circular table 12 of input/output control information in which a necessary number of commands to be executed are arranged in a circular manner in that NEXT COMMAND ADDRESS indicates the command address of the next information command, an input/output control program 13 for processing the interruption from the data input/output system 7, and input buffer memories 3' and 4' which correspond to the first and second buffers 3 and 4 in FIG. 1.

Operations, particularly the input operation for inputting data to the buffer memories 3, 4 from the data source 5 will be described:

(1) The data input program is executed a trigger for starting the data input/output system 7 to the input/output system control section 8 (as indicated by ① in FIG. 5).

Figure 6:
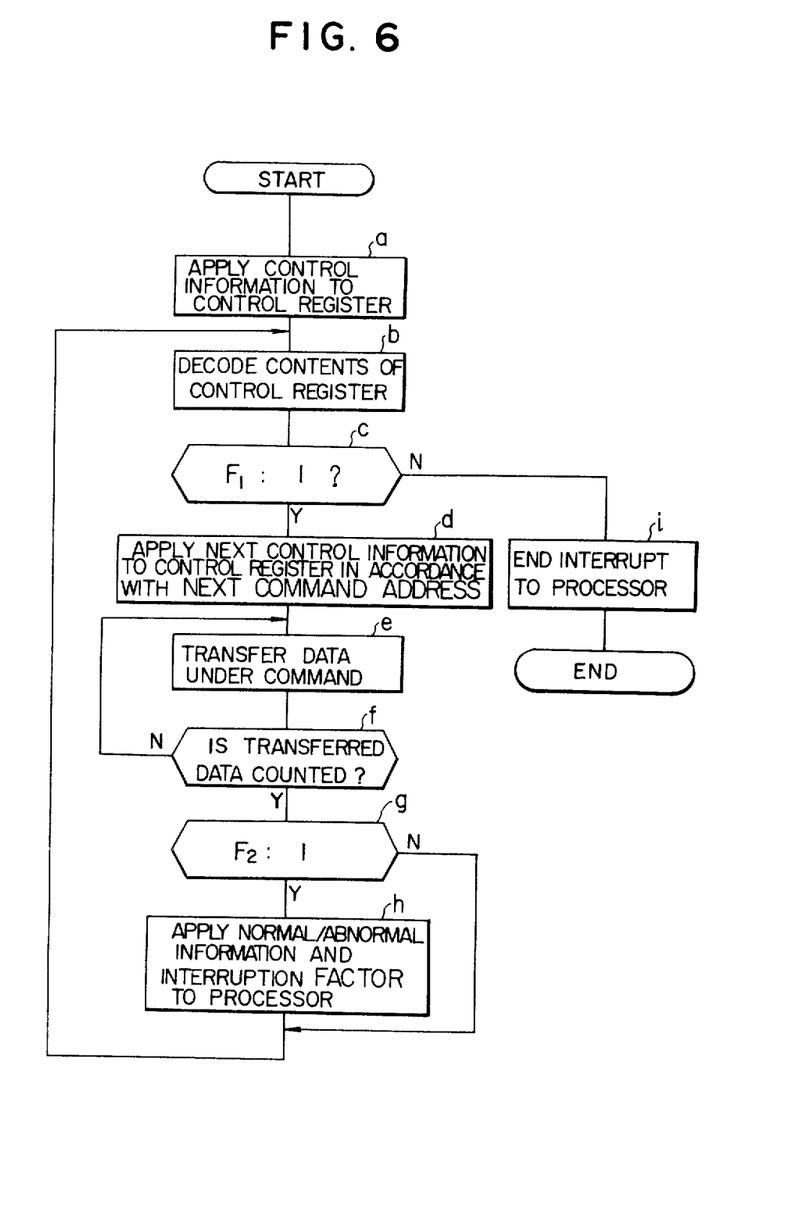
FIG. 6 is a flowchart of the operation of the data input/output system control section of the above embodiment.

(2) In accordance with the flowchart of FIG. 6, the input/output system control section 8 is supplied at the control register 10 with the first input/output control information from the processor 1 (②), this information is transmitted to the data input/output control section 11 (⑦) where it is decoded, and if the command chain flag $F_1 = 1$, the next input/output information according to the NEXT COMMAND ADDRESS is received by the control register 10 (②), or if the command chain flag $F_1 = 0$, an input/output end interrupt signal is outputted to the processor 1 from the data input/output control section 11 (⑤, ⑥).

(3) The command read, which was transferred from the control register 10 to the data input/output control section 11 where it was decoded, for example, is executed so that the data from the large-capacity data source 5 is read in accordance the DATA COUNT through the data transfer input/output bus 9 into the first buffer memory 3' which is specified by DATA ADDRESS (③, ④).

(4) If the interruption flag $F_2$ is "1" at the input/output control section 11, the INTERRUPTION FACTOR is applied to the processor 1 together with the interruption signal (⑤, ⑥), and then the contents of the control register 10 are decoded. Subsequently, the data input/output system 7 operates in accordance with the flowchart of FIG. 6 to continue the input/output operation in response to the instruction in the control register 10, independently of the processor 1.

(5) The processor 1 responds to the interruption signal from the data input/output system 7 to start the input/output control program 13. This program 13 detects the contents of INTERRUPTION FACTOR and renews the input/output control information in the circular table 12 (⑧). This process enables semipermanent data transfer. This input/output control program 13 simultaneously transmits the information that the first buffer 3' has become full of data.

(6) The data input program for inputting data starts the data storing program so that the contents of the first buffer 3' can be stored in the large-capacity memory.

Figure 7:
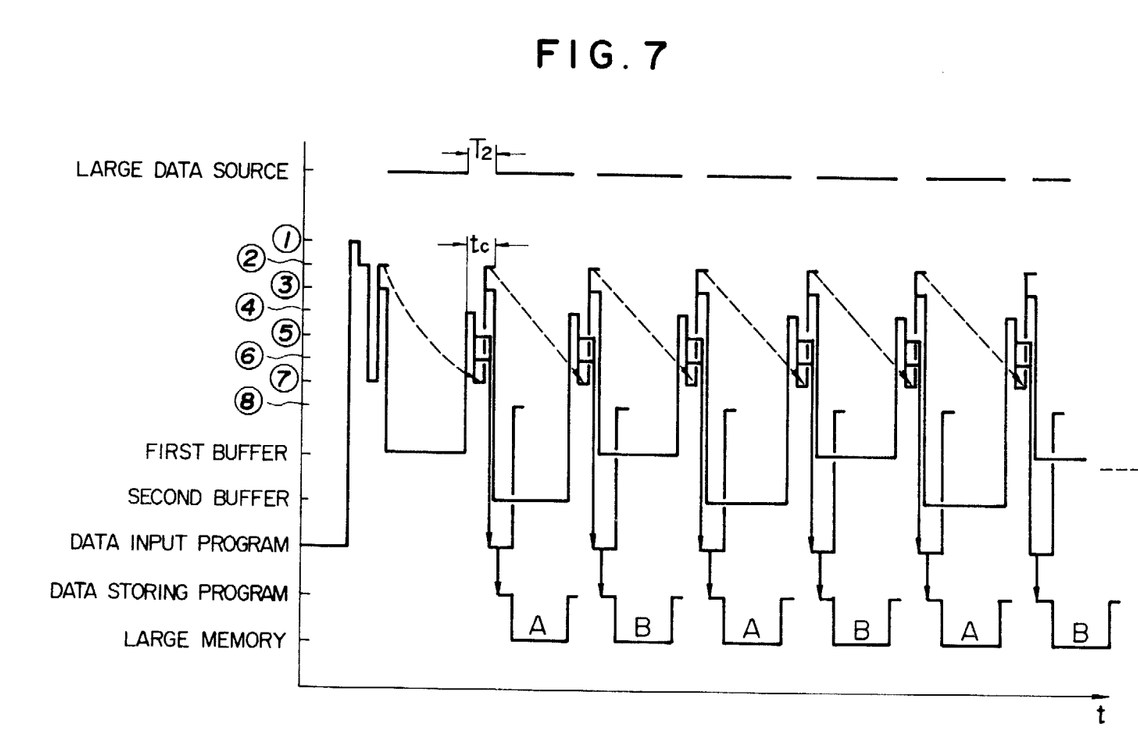
FIG. 7 is a timing chart of the operation of the above embodiment.

FIG. 7 shows the timing chart of the above operations. From the figure, it will be understood that for satisfying the timing chart as in FIG. 2, the time $t_c$ necessary for the data input/output system 7 to chain the respective commands must be shorter than the inter-transfer period $T_2$ from the large capacity data source 5, or $t_c < T_2$.

The time $t_c$ is at most several u sec which is taken for the sequence of steps g→h→b→c→d→e of FIG. 6, since all of these steps can be performed by hardware including high-speed elements. Therefore, the input/output system 7 according to the invention has less restriction in the relation between $t_c$ and $T_2$ than the conventional one.

Although in the above description the input from the large-capacity data source 5 has been considered, the output to the data source 5 may be performed without trouble in accordance with this invention.

Figure 8:
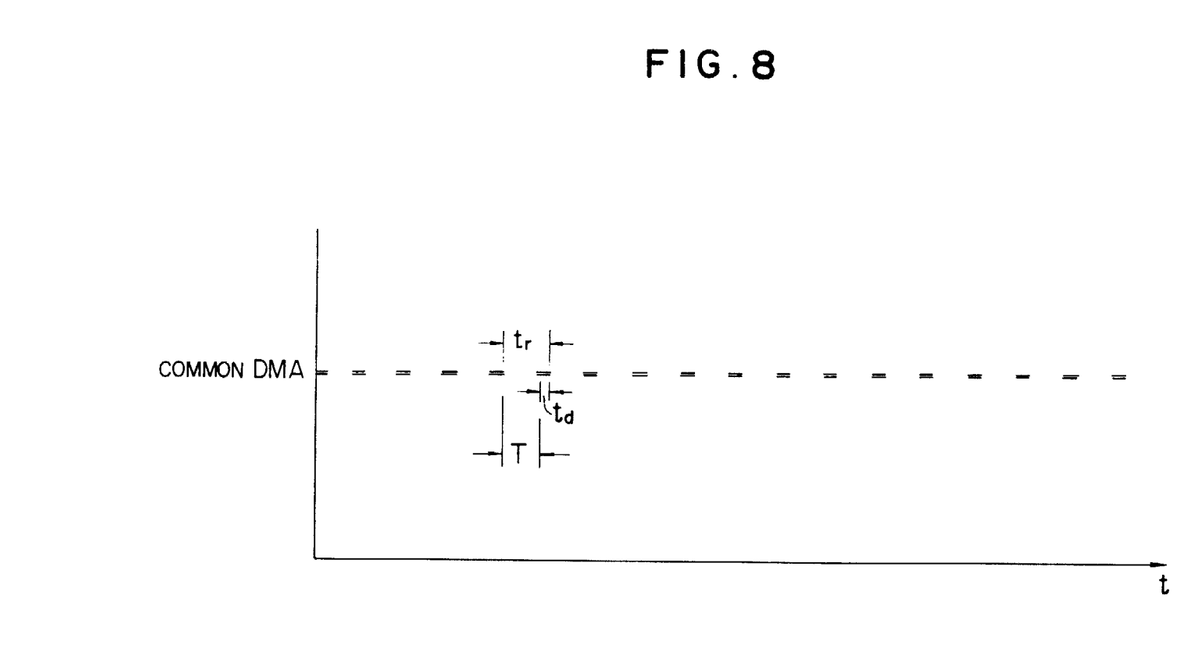
FIG. 8 is a timing chart of data transfer in the case when this invention is applied to a general direct memory access transfer.

Moreover, as shown in FIG. 8, if a common direct memory access (DMA) is supposed, the times, $T_1$ and $T_2$, which have been considered, can be thought of as T ($=t_r-t_d$) in FIG. 8. If $t_c$ is small enough and $t_c < T$, the infinitely continuous DMA transfer as shown by the broken line in FIG. 8 can be continued for the input and output processes, where $t_r$ represents the data transfer cycle period and $t_d$ the data transfer time per word.

In this connection, for the DMA of 100 kW/s, $t_r = 1/(100 \text{ kW/s}) = 10$ μs. Since the time $t_d$ is generally about 1 μs, $T = t_r - t_d = 9$ μs. Therefore, the time $t_c$, which is usually several μs, is smaller than T. In the prior art, the 16-bit machine performs the input/output operation of at most 64k-Words/s of data followed by the overhead of the operating system (OS), while the invention can provide an input/output system capable of performing input/output with a very short time requirement.

According to the invention, as described above, the time required for the transition from one input/output processing operation to the next input/output processing operation can be made much shorter than that in the conventional program system. Moreover, the circular table is a type of command register which can be renewed using the intermediate interruption, thereby permitting high-speed transfer of a large amount of data even if the flow of which is semipermanently continuous.

The histograming apparatus 14 as shown in FIG. 1 will be described as to its function. The histograming apparatus is provided at the input/output system to which image data is applied or from which it is supplied, to collect the histogram data in parallel with the input/output processing, thereby apparently decreasing the time taken for the histogram collection. A similar histograming apparatus is disclosed in U.S. Pat. No. 3,979,555.

The operation of the histograming apparatus 14, which is used in this invention, will be described in detail.

Figure 9:
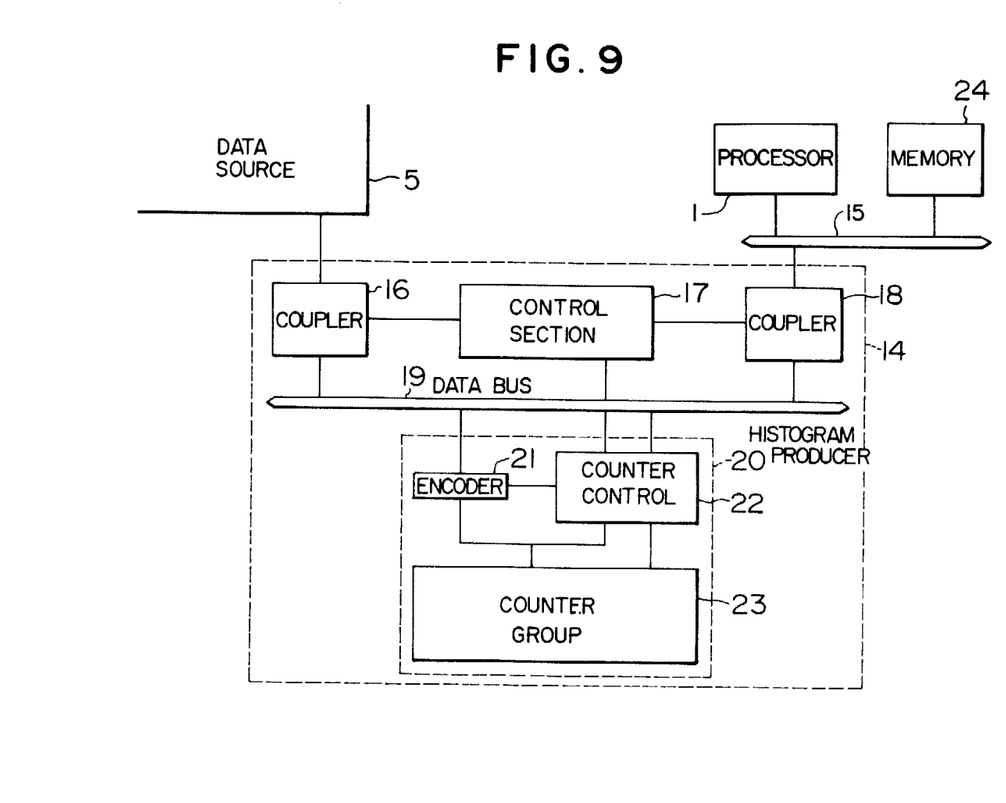
FIG. 9 is a specific arrangement of a histograming apparatus used in the invention.

FIG. 9 shows the arrangement of the histograming apparatus. This histograming apparatus includes coupling portions 16 and 18 connected to the input image source (magnetic tape) and computer input/output unit not shown, a data bus 19 for transfer of image data, a control portion 17 for giving instructions to a histogram making portion 20 by the signals from the coupling portions 16 and 18, a group of counters 23 for making the histogram corresponding to each image element, a counter address encoder 21 having the function of encoding the corresponding address of the counter group 23 from the image element value on the data bus 19, and a counter control section 22 having the functions of renewing the contents of the counter group by the command from the control section and the contents of the counter address encoder 21 and transferring the contents of the counter group through the data bus 19 to a processor memory 24.

Numeral 5 represents a reproducing high-density magnetic tape as a large-capacity data source as shown in FIG. 1, and the memory 24 is only the memory portion of the processor 1.

The operation of these elements will hereinafter be described with reference to FIGS. 9 and 10.

By the command from the processor 1 a RESET signal is first applied through the coupling portion 18 and control section 17 to the counter control section 22, thereby resetting the contents of the counter group 23 (Ⓐ). Then a data read-in command is issued from the processor 1 to start reading-in the satellite image data (Ⓑ). In other words, a signal from the reproducing high-density magnetic tape 5 is applied through the input coupling portion 16, the data bus 19, the output coupling portion 18 and the input/output bus line 15 to the processor memory 24, where it is stored. These operations are shown by the timing chart of FIG. 10, which is typically drawn in order to easily understand the operation timing, and in which the transfer of image data, renewal of the counter group and read-in of the histogram are shown in the vertical direction and the generation of a reset signal, start of read-in and so on are shown in the horizontal direction.

As in the above description of operation, the reset signal resets the counter group 23, the read-in start signal is applied from the processor 1 and the image data is transferred.

Figure 10:
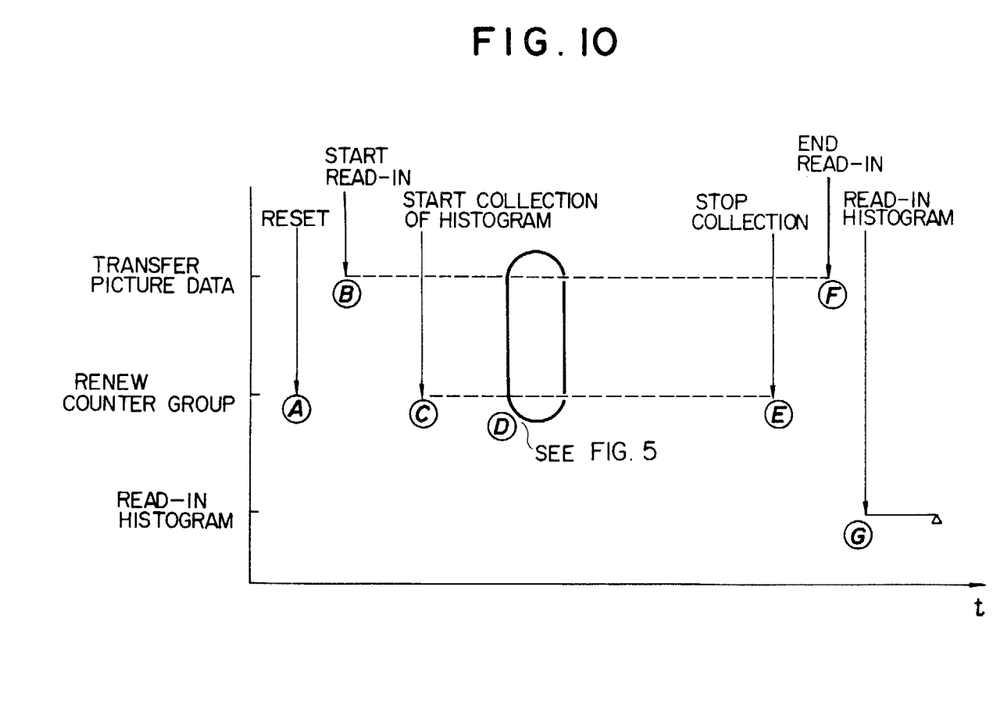
FIG. 10 is a timing chart of the operation of the histograming apparatus.

Then, the histogram data collection is started by the processor 1, and at the same time a start-command for histogram collection is applied to the counter control 22 through the output coupling portion 18 and the control portion 17 (Ⓒ in FIG. 10). The histogram data collection D will be described in detail later with reference to FIG. 11. When the histogram data collection is completed, a stop-command for stopping the histogram collection is applied from the processor 1 to the counter control section 22 through the output coupling portion 18 and the control portion 17 (Ⓔ) as in the operation Ⓒ. Then, the reading of the satellite image data is finished (Ⓕ) and subsequently the reading of the histogram data is started (Ⓖ), where the signal from the counter group 23 is read into the memory 24 through the counter control section 22, the data bus 19, the coupling portion 18, and the buffer memory 15.

Figure 11:
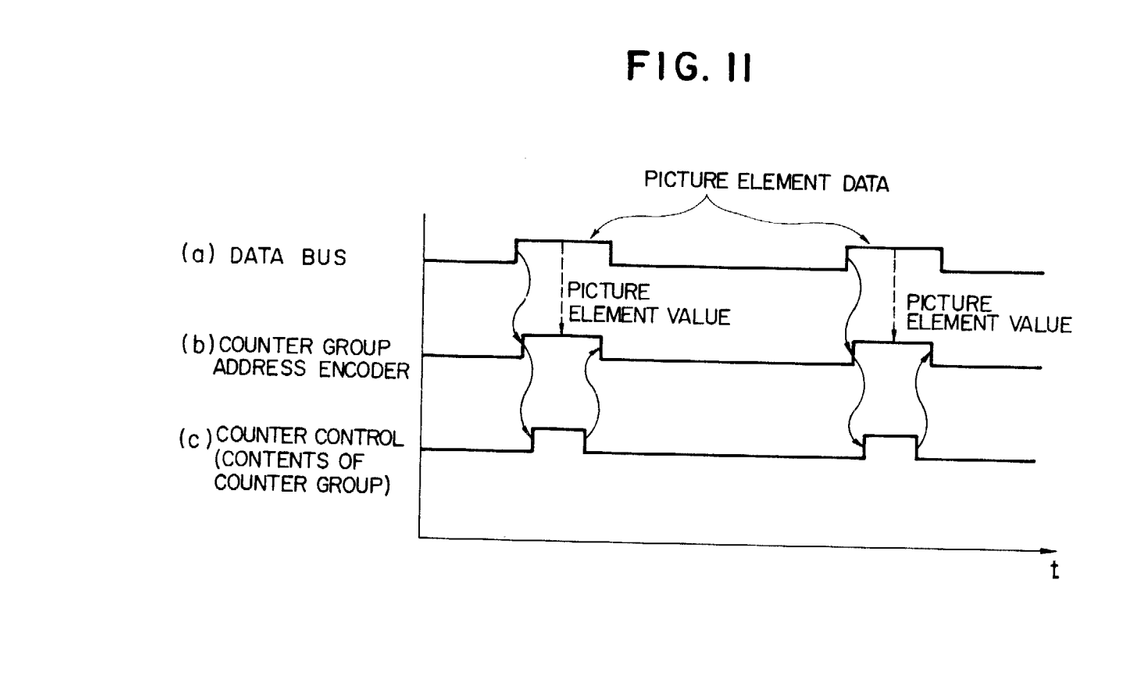
FIG. 11 is a detailed timing chart in the case when the counter group is renewed for making a histogram.

FIG. 11 shows the timing chart used for explaining the histogram data collection. At (a), image data from the reproducing high-density magnetic tape is shown on the data bus, at (b) the image data is encoded by the corresponding counter address encoder, and at (c) the contents of the counter group selected by the encoded signal are renewed or specifically the counter group counts up by +1 while the image signal is read into the computer. Thus, if the histograming apparatus 14 is not provided, the histogram data collection would be performed after the image data is stored in the large-capacity memory, and therefore it will be apparent that the use of the histograming apparatus as described above provides a greater advantage than the use of any prior art high-speed computer.

What is claimed is:

1. A data input/output method for transferring data between a large-capacity data source and a large-capacity memory connected to a processor by means of at least two buffer memories connected to said processor through an input/output bus, wherein the data transfer on the input/output bus is controlled by input/output control information decoded by a control section, said processor supplying a control register with said input/output control information having a command, a data count, a data address and a next-command address, comprising the steps of:

transmitting said input/output control information from said control register to said control section to be decoded therein;

supplying said control register with second input/output information from said next-command address in said input/output control information after said transmitting step;

transferring data up to the amount of said data count in said input/output control information through said input/output bus from or to one of said buffer memories on the basis of a result of said decoding;

transmitting said second input/output information from said control register to said control section to be decoded therein after said data transfer; and transferring data in accordance with said second input/output information from or to the other of said buffer memories.

2. A data input/output method in accordance with claim 1 further including the step of:

circulating said input/output information in accordance with said next-command address included therein toward said second input/output information so as to specify a portion of said second input/output information.

3. A data input/output method in accordance with claim 2 further comprising the step of:

applying an interruption after said data transferring step from said control section to said processor responding to a flag set by a program in said processor, thereby to achieve either ending the data transfer or renewing any input/output information.

4. A data input/output system comprising:
(a) a large-capacity data source;
(b) a processor including means for processing data from said large-capacity data source;
(c) a buffer memory including means for temporarily storing data from said large-capacity data source;
(d) a large-capacity memory including means for storing data from said buffer memory;
(e) data input/output controller means responsive to receipt from said processor of input/output control information for controlling data transfer between said large capacity data source and said buffer memory; and
(f) a data transfer input/output bus connected to said processor, said large-capacity memory, said data input/output controller means, said large-capacity data source and said buffer memory;
(g) said processor further including storage means in the form of a circular table wherein input/output control information is stored, said control information including an address for specifying successive control information circularly in said storage means and at least a first flag for indicating an interrupt condition;
(h) said input/output means including means for generating a first interruption signal to said processor so as to cause said processor to renew the control information in said circular table if said first flag is set in said control information.

5. A data input/output system according to claim 4 wherein said data input/output controller includes control register means for storing said control information from said processor while said data input/output controller controls said data transfer.

6. A data input/output system according to claim 4 wherein said data input/output controller includes means for generating a second interruption signal to said processor so as to end said data transfer if a second flag is set by said processor.

7. A data input/output system according to claim 4 further comprising a histograming apparatus connected to said transfer input/output bus, wherein said data from said large-capacity data source is image data, comprising:
a plurality of counters having an address input for each of said counters, and
a counter address encoder for encoding an image element included in said image data so as to output an encoded address,
wherein a counter specified by said encoded address counts up while said data is transferred through said data transfer input/output bus.

8. A method of controlling the transfer of data between a large-capacity data source and a buffer memory by means of a bus in response to a control program having a plurality of sets of control information, each set including at least a command, a data count value, a data address, a next-command address and a flag bit, comprising the steps of:
(1) storing in a storage device a plurality of sets of control information relating to a program for transferring data from said large capacity data source into said buffer memory via said bus;
(2) reading out a first set of control information from said storage device to a control register;
(3) decoding said first set of control information in said control register, including determining whether the flag bit is set therein;
(4) if said flag bit of said first set of control information is set, reading out a second set of control information from the storage location in said storage device identified by the decoded next-command address of said first set into said control register and executing the decoded command of said first set by controlling said bus to effect the transfer of successive data elements in number corresponding to the decoded data count value of said first set from said large-capacity data source to the data address in said buffer memory decoded from said first set of control information;
(5) repeating steps (1) through (4) for further sets of control information in said storage device until it is detected in a decoded set of control information that the flag bit is not set; and
(6) selectively resetting the flag bit in any one of the plurality of sets of control information stored in said storage device.

9. A method according to claim 8 wherein each set of control information includes a second flag bit and said decoding step (3) includes determining whether said second flag bit is set, further including the steps of:
(7) if said second flag bit is set, renewing at least some of the sets of control information stored in said storage device as to the data count value, data address and/or next-command address thereof; and
(8) selectively setting said second flag bit in any one of the plurality of sets of control information stored in said storage device.

10. A method according to claim 8, wherein said storage device is in the form of a circular table in which successive sets of control information are stored at successive storage locations.

11. A method according to claim 8, wherein each set of control information includes a second flag bit and said decoding step (3) includes determining whether said second flag bit is set, further including the steps of:
(7) if said second flag bit is set, transferring data out of said buffer memory to a large capacity memory; and
(8) selectively setting said second flag bit in any one of the plurality of sets of control information stored in said storage device.

12. A method according to claim 8 wherein each set of control information includes a second flag bit and an interruption designation which identifies a first or a second type of interruption, and said decoding step (3) includes determining whether said second flag bit is set, further including the steps of:
(7) if said second flag bit is set and said interruption designation indicates a first type of interruption, renewing at least some of the sets of control information stored in said storage device as to the data count value, data address and/or next-command address thereof;
(8) if said second flag bit is set and said interruption designation indicates a second type of interruption, transferring data out of said buffer memory to a large capacity memory; and
(9) selectively setting said second flag bit and said interruption designation in any one of the plurality of sets of control information stored in said storage device.

13. A system for controlling the transfer of data from a large-capacity data source to a buffer memory via a bus in response to a control program having a plurality of sets of control information, each set including at least a command, a data count value, a data address, a next-command address and a flag bit, comprising:

a processor connected to said bus and including said buffer memory, said storage means, means for processing data from said large-capacity data source, and means for initiating transfer of data from said large-capacity data source to said buffer memory by generation of a start signal;

storage means for storing a plurality of sets of control information in addressable storage locations; and control means connected to said processor and said bus for controlling said bus to effect transfer of data from said large-capacity memory to said buffer memory including register means responsive to said start signal for reading out and storing a first set of control information from said storage means, decoding means connected to said register means for decoding the set of control information stored in said register means, and means responsive to said decoding means for controlling said register means to read out and store another set of control information from the address in said storage means indicated by the decoded next-command address of said first set when the flag bit in the set of control information in said register means is set and for controlling said bus to effect transfer of successive data elements in number corresponding to the decoded data count value of said set of control information in said register means from said large-capacity data source to the decoded data address in said buffer memory derived from said set of control information in said register means.

14. A system according to claim 13, wherein each set of control information in said storage means also includes a second flag bit, and wherein said processor further includes means connected to said decoding means for renewing at least some of the sets of control information in said storage means as to the data count value, data address and/or next-command address thereof when the second flag bit of the set of control information in said register means is set.

15. A system according to claim 13, further including a large capacity memory, and wherein each set of control information in said storage means also includes a second flag bit, and wherein said processor further includes means connected to said decoding means for initiating the transfer of data from said buffer memory to said large-capacity memory when the second flag bit of the set of control information in said register means is set.

16. A system according to claim 13, further including a large-capacity memory, and wherein each set of control information in said storage means also includes a second flag bit and an interruption designation which identifies a first or a second type of interruption, and wherein said processor further includes means connected to said decoding means for renewing at least some of the sets of control information in said storage means when the second flag bit is set and the interruption designation indicates a first type of interruption in the set of control information in said register means and for initiating the transfer of data from said buffer memory to said large-capacity memory when the second flag bit is set and the interruption designation indicates a second type of interruption in the set of control information in said register means.

17. A system according to claim 13, wherein said storage means comprises a storage device in the form of a circular table in which successive sets of control information are stored at successive storage locations.

18. A system according to claim 13, further comprising a histograming means connected to said bus for making a histogram of the data transmitted by said bus.

* * * * *